No. 815,189. PATENTED MAR. 13, 1906.
J. MANYPENNY.
BRICK KILN.
APPLICATION FILED OCT. 4, 1905.

2 SHEETS—SHEET 1.

WITNESSES
Warren W. Swartz
R A Balderson

INVENTOR
John Manypenny
by Bakewell & Byrnes
his attys

No. 815,189. PATENTED MAR. 13, 1906.
J. MANYPENNY.
BRICK KILN.
APPLICATION FILED OCT. 4, 1905.

2 SHEETS—SHEET 2.

WITNESSES
Warren W. Swartz
R. A. Balderson

INVENTOR
John Manypenny
by Bakewell Byrnes
his attys

UNITED STATES PATENT OFFICE.

JOHN MANYPENNY, OF NEW BRIGHTON, PENNSYLVANIA.

BRICK-KILN.

No. 815,189.        Specification of Letters Patent.        Patented March 13, 1906.

Application filed October 4, 1905. Serial No. 281,220.

*To all whom it may concern:*

Be it known that I, JOHN MANYPENNY, of New Brighton, Beaver county, Pennsylvania, have invented a new and useful Improvement in Brick-Kilns, of which the following is a full, clear, and exact description, reference being had to the accompanying drawings, forming part of this specification, in which—

Figure 1:
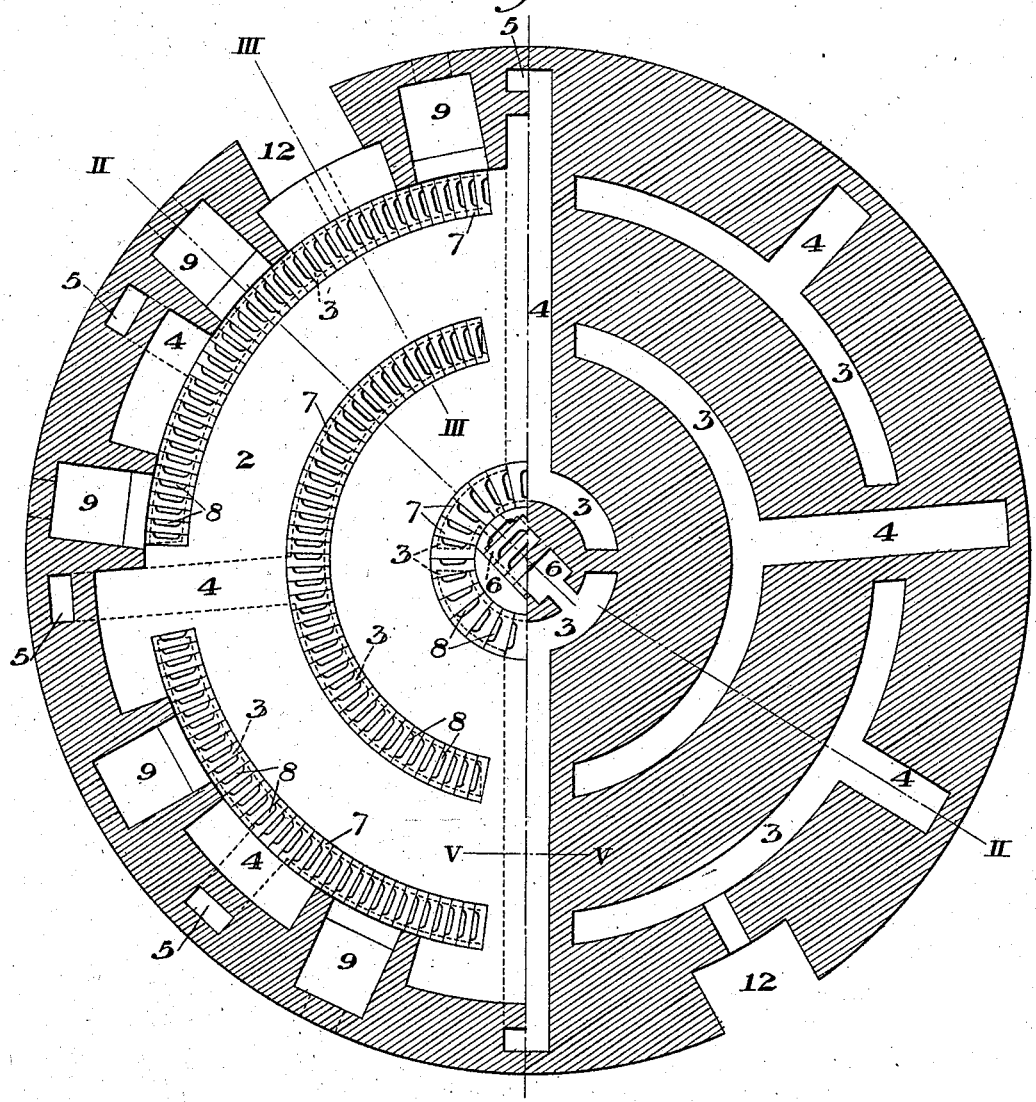
Figure 5:
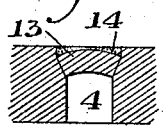
Figure 2:
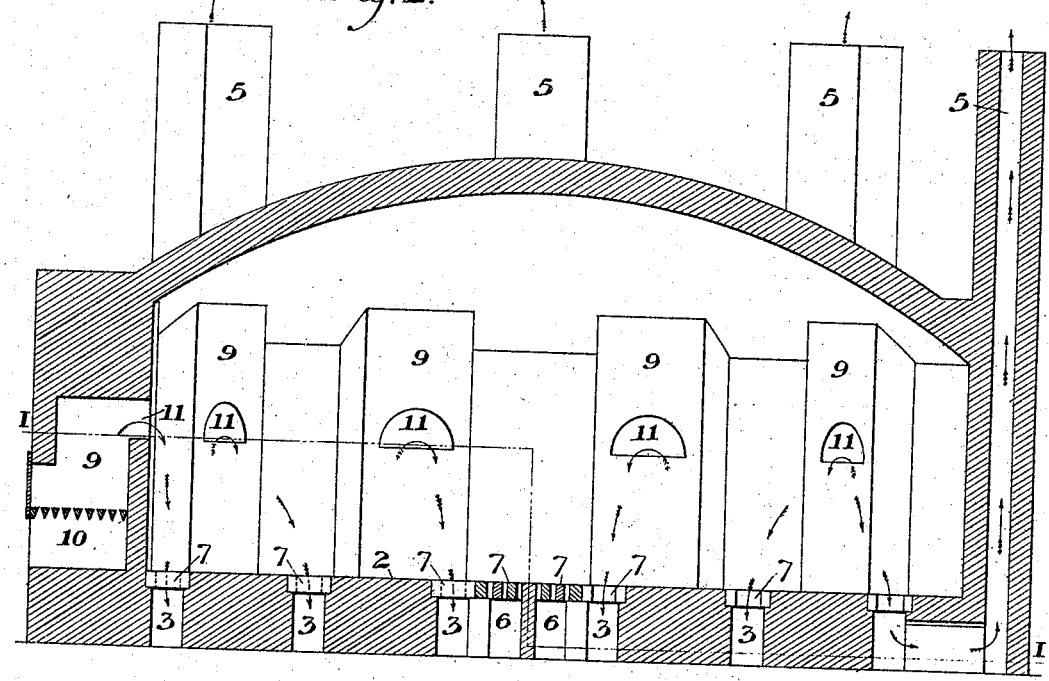
Figure 3:
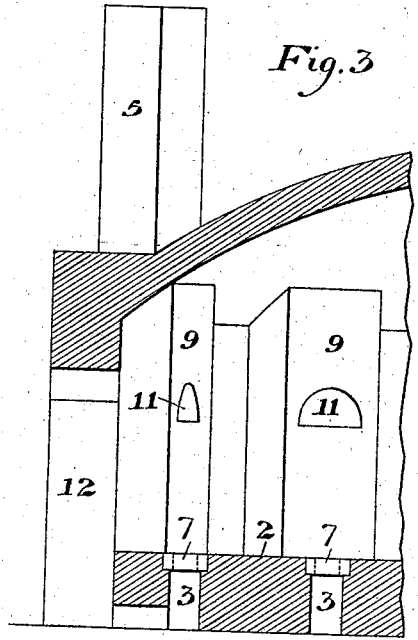
Figure 4:
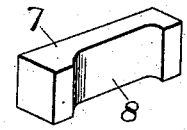

Figure 1 is a horizontal section of a kiln embodying my invention, the section being taken on the line I I of Fig. 2, one half the section being below the kiln-floor and the other half above said floor. Fig. 2 is an interrupted section on the line II II of Fig. 1. Fig. 3 is a fragmentary section on the line III III of Fig. 1, showing one of the charging-doors. Fig. 4 is a detail perspective view of one of the removable flue-cover bricks, and Fig. 5 is a section on the line V V of Fig. 1.

My invention relates to the class of downdraft-kilns used for burning brick, crockery, and other clay and pottery products wherein the furnaces and stacks are circumferentially arranged, and the floor is provided with ports or openings communicating with flues below the floor and leading to the stack.

My object is to provide a downdraft-kiln in which the heat is effectively distributed over the entire floor, in which a maximum floor-space is provided, and in which provision is made for ready and convenient access to the flues for any purpose.

I obtain the foregoing objects by the novel construction, arrangement, and combination of the parts, all substantially as hereinafter described, and pointed out in the appended claim.

In the drawings, 2 designates the floor of the kiln, below or in which are formed a plurality of concentrically-arranged circular flues 3, each of which is connected by radial flues 4 with a stack 5. The flues 3 may be continuous throughout their length; but I prefer to break them up into sections in the manner shown in Fig. 1 and to provide each section with a flue 4, leading to a stack. I also provide the short enlarged flues 6, which lead from the inner circular flues 3 to the central portion of the kiln, in order to provide for a strong draft at this point.

Each of the circular flues 3 and also, preferably, the flues 6 are covered by means of a plurality of separate removable bricks 7, one of which is shown in detail in Fig. 4 and each of which is provided at one side with a recess or channel 8, which when placed against the adjacent brick forms a port leading through the floor of the kiln into the flue 3. By means of these bricks I provide a sufficient area of ports to insure a strong downdraft from the kiln, and inasmuch as the bricks are separately removable ready access may be had at any time to any portion of these flues for cleaning or other purposes. The radial flues 4, however, are preferably solidly closed at the top, as the ports at these places will tend to decrease the draft.

The circumferentially-arranged furnaces are indicated at 9. These furnaces have the grates 10 and the openings 11 leading through their inner walls to the interior of the kiln. Each furnace has separate lateral walls, whereby the spaces between them may be utilized.

12 indicates the charging-doors for the kiln, of which any desired number may be provided.

The heat and products of combustion from the furnaces 9 pass to the interior of the kiln through the passages 11 and are thoroughly distributed throughout the kiln by means of the flue-and-draft arrangement described.

The flue-covering bricks 7 are set so that their upper surfaces are level with the surface of the floor 2, and the arches 13 over the radial flues 4 are filled over, as indicated at 14 in Fig. 5, to also provide a flush surface, so that a flat level floor is provided for the entire kiln.

It is obvious that the number of circular and radial flues may be more or less than that shown in the drawings, as may be desired, according to the size of the kiln, and that the number of stacks and radial flues may be changed accordingly without affecting my invention.

What I claim is—

In a downdraft brick-kiln, a series of concentric circular flues in the floor of the kiln, the inner one of said flues having short enlarged flues extending inwardly therefrom to the center of the kiln, and providing for an effective central draft, and removable covers for the said flues; substantially as described.

In testimony whereof I have hereunto set my hand.

JOHN MANYPENNY.

Witnesses:
    DANIEL CLEAR,
    WM. LLOYD.